United States Patent
Vyas et al.

(10) Patent No.: US 9,491,795 B2
(45) Date of Patent: Nov. 8, 2016

(54) EXTENDED CONNECTIVITY BASED ON WIRELESS PATHS BETWEEN STATIONS OF A WIRELESS LOCAL AREA NETWORK (WLAN)

(71) Applicant: GainSpan Corporation, San Jose, CA (US)

(72) Inventors: Pankaj Vyas, Bangalore (IN); Vishal Batra, Bangalore (IN); Sibasis Purohit, Bangalore (IN)

(73) Assignee: GAINSPAN CORPORATION, San Jose, CA (US)

(*) Notice: Subject to any disclaimer, the term of this patent is extended or adjusted under 35 U.S.C. 154(b) by 330 days.

(21) Appl. No.: 13/719,255

(22) Filed: Dec. 19, 2012

(65) Prior Publication Data

US 2014/0169349 A1  Jun. 19, 2014

(51) Int. Cl.
*H04W 84/12* (2009.01)
*H04W 40/34* (2009.01)
*H04L 12/721* (2013.01)

(52) U.S. Cl.
CPC .............. *H04W 84/12* (2013.01); *H04L 45/34* (2013.01); *H04W 40/34* (2013.01); *H04L 45/32* (2013.01)

(58) Field of Classification Search
CPC ... H04W 84/12; H04W 48/20; H04W 88/00; H04W 88/021
USPC .................................. 370/328, 352; 455/434
See application file for complete search history.

(56) References Cited

U.S. PATENT DOCUMENTS

| | | | |
|---|---|---|---|
| 8,094,637 B1 * | 1/2012 | Goel | H04W 40/246 370/254 |
| 2003/0161341 A1 * | 8/2003 | Wu et al. | 370/448 |
| 2005/0122955 A1 * | 6/2005 | Lin | H04L 45/04 370/351 |
| 2006/0007945 A1 | 1/2006 | Schoettle et al. | |
| 2008/0075029 A1 | 3/2008 | Song | |
| 2008/0316951 A1 | 12/2008 | Zeng et al. | |
| 2008/0317047 A1 | 12/2008 | Zeng et al. | |
| 2009/0003291 A1 | 1/2009 | Chu et al. | |
| 2009/0135851 A1 | 5/2009 | Veillette | |
| 2009/0252134 A1 * | 10/2009 | Schlicht et al. | 370/338 |
| 2009/0279487 A1 | 11/2009 | Reumerman et al. | |
| 2009/0323631 A1 * | 12/2009 | Bajic | H04W 8/12 370/331 |
| 2010/0039992 A1 * | 2/2010 | Prakash | H04W 8/005 370/328 |
| 2010/0115272 A1 * | 5/2010 | Batta | H04L 45/00 713/162 |

(Continued)

OTHER PUBLICATIONS

Vishnu Navda, Anand Kashy and Samir R. Das, Design and Evaluation of iMesh: an Infrastructure-mode Wireless Mesh Network, http://www.wings.cs.sunysb.edu/~vnavda/pubs/iMesh.pdf, pp. 1-12, NewYork.

*Primary Examiner* — Chandrahas Patel
*Assistant Examiner* — Lan Huong Truong
(74) *Attorney, Agent, or Firm* — IPHorizons PLLC; Narendra Reddy Thappeta

(57) ABSTRACT

A wireless station in a WLAN generates a first set of data elements for sending to a final destination. The wireless station forms a first Internet Protocol (IP) packet with a header portion and a payload portion. The header portion specifies an IP address of a neighbor access point (AP) as the next hop destination. The payload portion of the IP packet includes an IP address of the final destination to indicate that the data elements are to be delivered to the final destination. The wireless station transmits the IP packet to the neighbor AP according to the IP address of the neighbor AP. Extended connectivity based on wireless paths between stations of a wireless local area network (WLAN) is thus provided.

17 Claims, 6 Drawing Sheets

(56) References Cited

U.S. PATENT DOCUMENTS

| | | | |
|---|---|---|---|
| 2011/0206055 A1* | 8/2011 | Leong | H04L 49/00 370/401 |
| 2011/0274082 A1* | 11/2011 | Calhoun et al. | 370/331 |
| 2012/0166582 A1* | 6/2012 | Binder | H04L 63/18 709/217 |
| 2013/0094447 A1* | 4/2013 | Gidlund | H04L 69/22 370/328 |

* cited by examiner

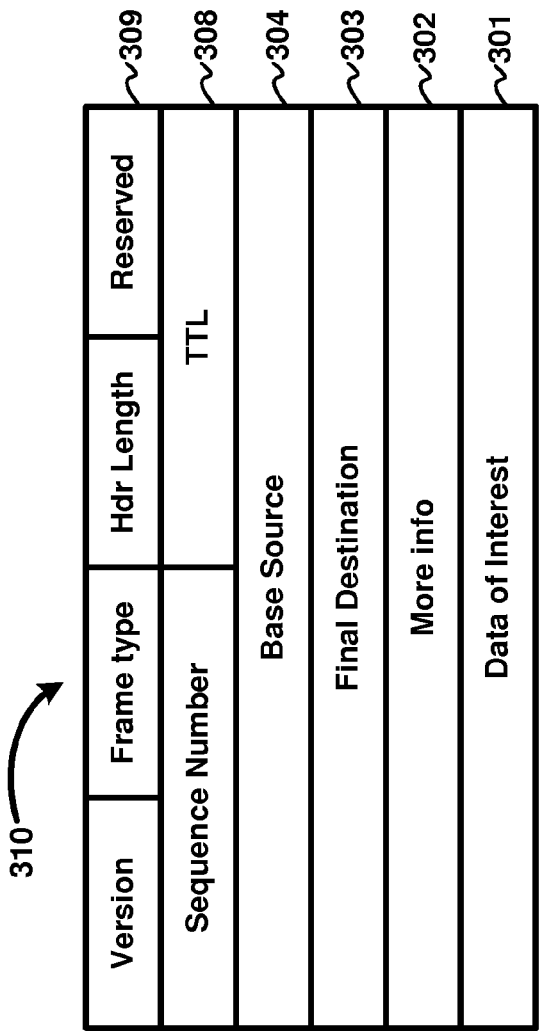
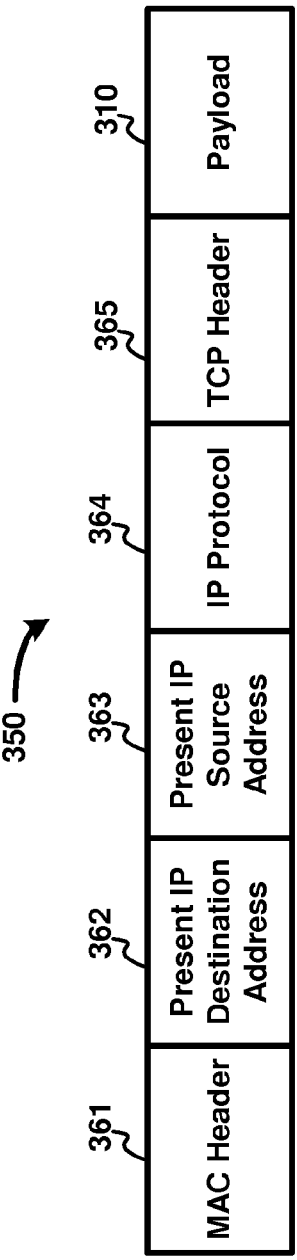
FIG. 3A
FIG. 3B

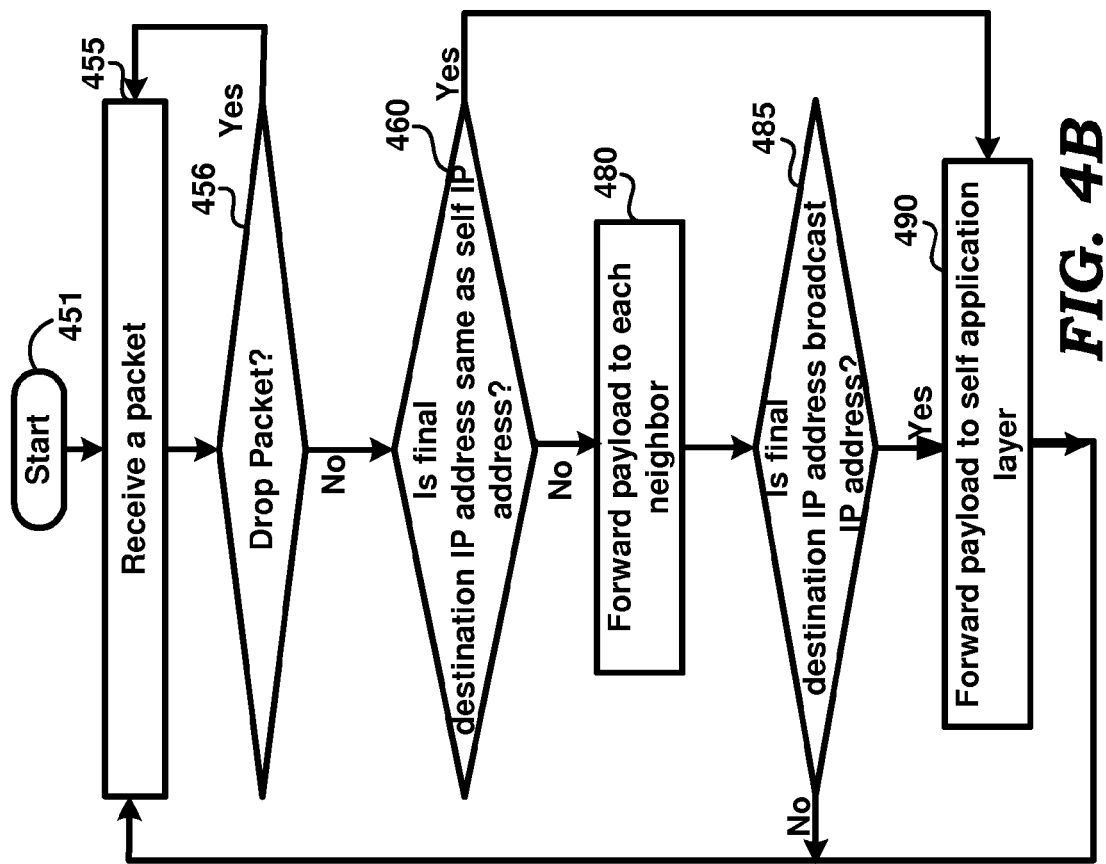
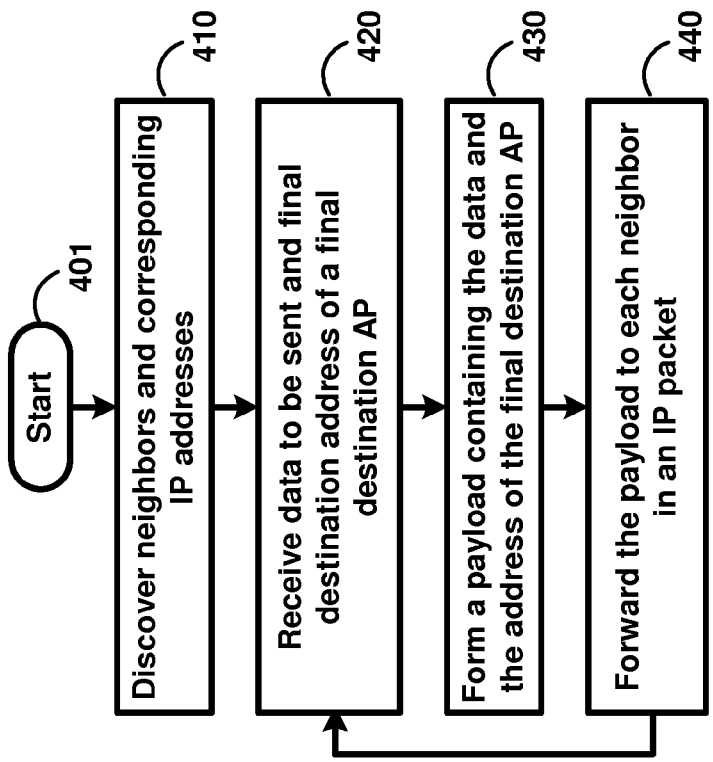
FIG. 4B
FIG. 4A

FIG. 5A (500)

| Neighbor | IP address | MAC address |
|---|---|---|
| AP120 | IP2 | MAC2 |
| AP130 | IP3 | MAC3 |
| AP140 | IP4 | MAC4 |

FIG. 5B (510)

| Neighbor | IP address | MAC address |
|---|---|---|
| AP110 | IP1 | MAC1 |
| AP130 | IP3 | MAC3 |

FIG. 5C (520)

| Neighbor | IP address | MAC address |
|---|---|---|
| AP140 | IP4 | MAC4 |
| AP150 | IP5 | MAC5 |

EXTENDED CONNECTIVITY BASED ON WIRELESS PATHS BETWEEN STATIONS OF A WIRELESS LOCAL AREA NETWORK (WLAN)

BACKGROUND OF THE INVENTION

1. Technical Field

Embodiments of the present disclosure relate generally to wireless local area networks (WLANs), and more specifically to providing extended connectivity based on wireless paths between access points of a WLAN.

2. Related Art

A Wireless Local Area Network (WLAN) refers to a local area network in which nodes communicate on wireless medium. WLANs are commonly implemented in accordance with IEEE 802.11 standard, as is well known in the relevant arts.

WLANs are generally designed for stations to send or receive data packets. The data packets may be sent to other stations in the WLAN or to external machines connected, for example, via Internet. Similarly, the data may be received from other stations/machines in the form of data packets.

Stations of a WLAN typically have a short signal communication range, and accordingly WLANs contain access points (APs), which are designed to act as relay points for extending the communication range between two stations. Thus, a data packet may be forwarded by multiple APs before reaching a destination station.

However, even APs have limited signal communication range and accordingly each AP may not be able to communicate directly with all the other APs/stations of the WLAN. There is accordingly a general need to extend connectivity between APs.

WDS (Wireless Distribution System) is an example system, which allows APs to communicate with each other using wireless medium, without having to use wire-based backbone between the APs. WDS permits such connectivity while preserving the source and destination MAC addresses of frames across links between APs, as is well known in the relevant arts.

It may be desirable to provide such extended connectivity using alternative techniques more suited for corresponding environments.

BRIEF DESCRIPTION OF THE VIEWS OF DRAWINGS

Example embodiments of the present invention will be described with reference to the accompanying drawings briefly described below.

FIG. 3A is a diagram illustrating the details of a payload portion of a packet transmitted by an AP, in an embodiment of the present invention.

FIG. 3B is a diagram illustrating the details of an IP packet transmitted by an AP, in an embodiment of the present invention.

FIG. 4A is a flowchart illustrating the operations in an AP that is the source of data destined for a final destination AP, in an embodiment of the present invention.

FIG. 4B is a flowchart illustrating the operations in an AP that is either a destination AP for a payload or an intermediary AP for further forwarding the payload, in an embodiment of the present invention.

FIGS. 5A, 5B and 5C are example tables that are stored in APs, in an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present invention, a wireless station in a WLAN generates a first set of data elements for sending to a final destination. The wireless station forms a first Internet Protocol (IP) packet with a header portion and a payload portion. The header portion specifies an IP address of a neighbor access point (AP) as the next hop destination. The payload portion of the IP packet includes, in addition to the first set of data elements, an IP address of the final destination to indicate that the data elements are to be delivered to the final destination. The wireless station transmits the IP packet to the neighbor AP according to the IP address of the neighbor AP. Extended connectivity based on wireless paths between stations of a wireless local area network (WLAN) is thus provided.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
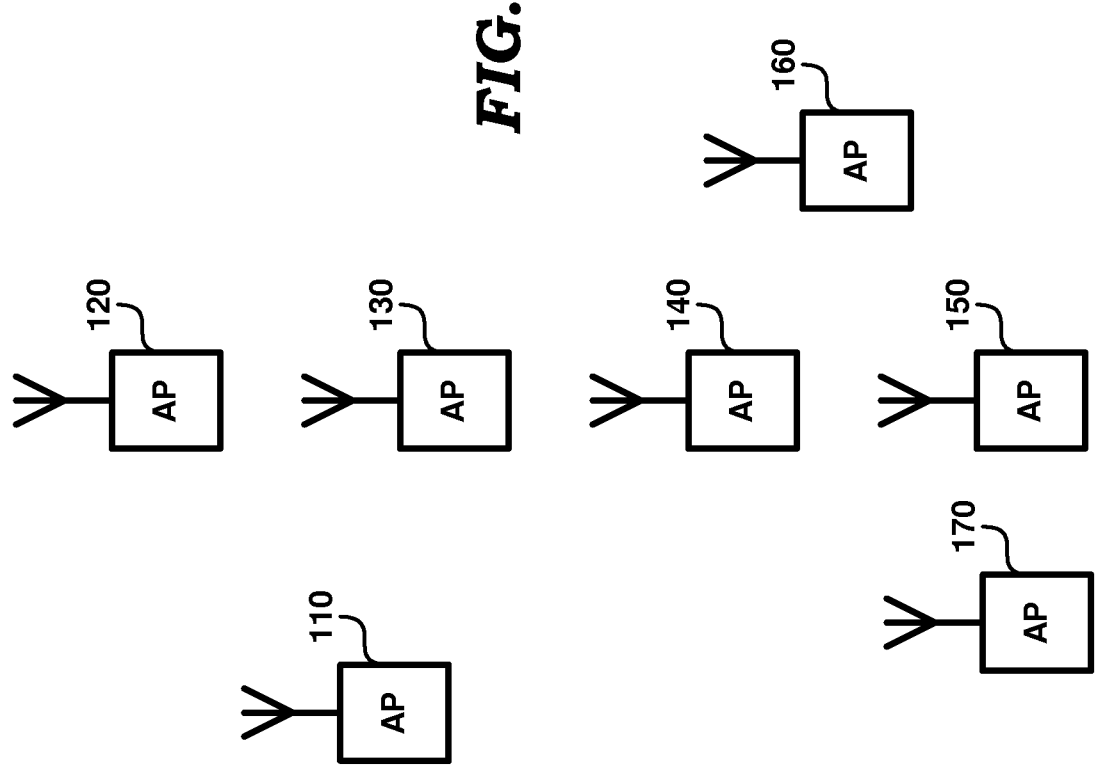
FIG. 1 is a block diagram of an example environment in which several features of the present invention can be implemented.

FIG. 1 is a block diagram of an example environment in which several features of the present invention may be implemented. FIG. 1 is shown containing access points APs 110, 120, 130, 140, 150, 160 and 170. At least some of the APs are sources/destinations of data, and may have corresponding applications executing in them. Thus, an application in one AP (for example, AP 110) may need to communicate with an application in another AP (for example, AP 160) using corresponding communication techniques or protocols and over a wireless medium.

Access points AP 110 through AP 170 may each be physically located (and operating with corresponding transmit powers and receiver sensitivities) such that data transfer between a source AP and a destination AP requires one or more APs to operate as 'intermediary' nodes to forward the data along a path from the source AP to the destination AP. A pair of APs are said to be 'neighbors' if they are within communication range of each other, i.e., if a signal transmitted by one AP can be received by the other AP in the pair, and vice-versa. Thus, a pair of neighboring APs can transfer data between each other without requiring a third AP to forward the data as an intermediary.

In the example of FIG. 1, the following neighbor-relationships are assumed:
- AP 110, AP 120, AP 130 and AP 140 are neighbors (of each other).
- AP 140, AP 150 and AP 160 are neighbors.
- AP 170 and AP 150 are neighbors.

Each of the APs has a corresponding medium access control (MAC) address to communicate at data link (MAC) layer in accordance with WLAN related standards. In addition, each AP is assigned a unique IP address. In an embodiment, the IP address of each AP is selected as a class A IP address, with the first byte commonly identifying the network address for all APs, and the remaining three bytes being set to the least significant 3 bytes of the MAC address of the corresponding AP. For example, assuming has a MAC address "00:1D:C9:1A:2B:9F", the corresponding IP address using Class A subnet with Network ID 10 would be 10.26.43.159.

Embodiments of the present invention enable formation of a wireless "mesh" network containing multiple APs, as described in detail below.

3. Extended/Mesh Connectivity Between APs

Figure 2:
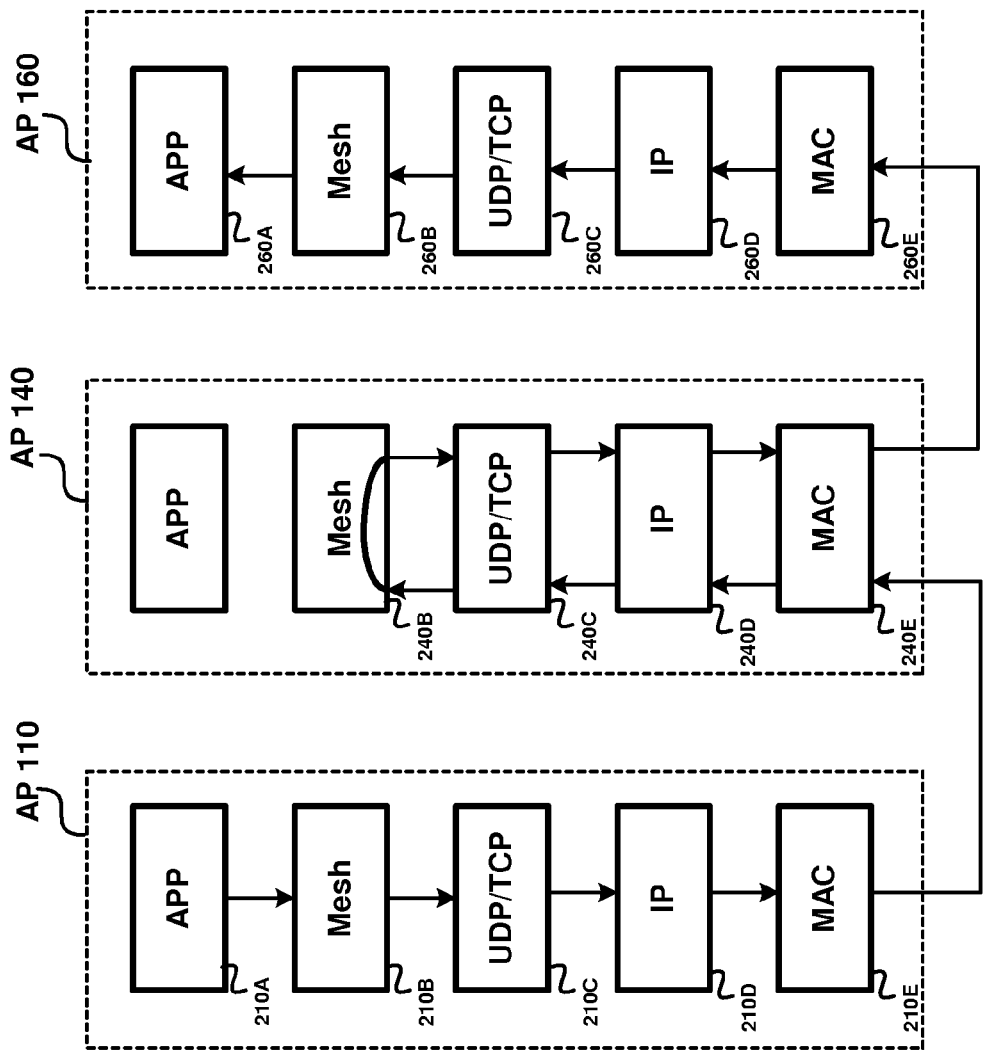
FIG. 2 is a block diagram illustrating the operation of various components of protocol stacks in APs in performing data transfer from a source AP to a destination AP, according to an aspect of the present invention.

FIG. 2 is a block diagram illustrating the operation of various components of protocol stacks in APs in performing data transfer from source AP 110 to destination AP 160 according to an aspect of the present invention. While the details of only APs 110, 140 and 160 are shown, only those APs having an internal application to create/consume data may have application (APP) layer shown in the three diagrams. Thus, a station creating data is shown operating as an AP as well.

FIG. 2 illustrates a data transfer between AP 110 and AP 160 via intermediate node AP 140. Since AP 110 and AP 160 are not within direct communication range of each other, a third intermediate node (AP 140, in the example) operates to forward data packets received from AP 110 onto AP 160. Application layer (APP) 210A of AP 110 generates/creates (distinguished from mere relay/transfer by intermediate AP 140) data that is to be transferred to application layer (APP) 160A of AP 160.

Mesh layer 210B of AP 110 receives data from APP 210A, and forms payload frame 310 that includes the data elements of interest in data field 301, more information 302, final destination 303, base source 304 and header fields in 308/309, as depicted in FIG. 3A. Final destination 303 contains an identifier that uniquely identifies the AP/station (here the identifier of AP 160) to which the frame is to be eventually delivered. Base source 304 specifies an identifier that uniquely identifies the AP/station (here AP 110) from which the frame originates (and where data elements in field 301 was created). In an embodiment, each of the identifiers is a corresponding IP address such that fields 303 and 304 would respectively contain the IP addresses of APs 160 and 110.

Sequence number in field 308 uniquely identifies the payload frame and can be formed to identify the base source and a unique number generated within source AP 110. This value may remain unchanged as the frame is transmitted across multiple APs. TTL (time to live) in field 308 may specify the number of hops (between each pair of APs) the packet is permitted to take. The value may be decremented for each hop such that an AP may discard the frame if TTL is zero.

In field 309, version indicates a format convention being employed for payload frame 310. Frame type can indicate whether the packet is a data frame or a management command. In case the frame type is a management command, the final destination AP may respond with the corresponding information. Management commands can be used for gathering various statistics, receiving configuration data and setting any desired parameters, according to pre-specified conventions, the implementation of which will be apparent to a skilled practitioner based on the disclosure herein. The header length indicates the length of all fields except 301.

Mesh layer 210B then requests UDP/TCP layer 210 to transmit payload frame 310 to each of neighbor APs 120, 130 and 140 as corresponding individual IP packet streams. For simplicity, it is assumed that frame 310 can be transmitted as a single IP/MAC packet and the description is continued accordingly. For ease of understanding, the description is continued with respect to only the packet that is transmitted to AP 140, though the description that follows clarifies the processing of packets sent to APs 120 and 130.

UDP/TCP 210C, IP 210D and MAC 210E layers together operate to form wireless packet 350 shown in FIG. 3B. MAC header 361 contains the MAC address of AP 110 as source MAC address and that of AP 140 as the destination MAC address. Present IP destination 361 and source 362 are respectively set to the IP addresses of AP 140 and AP 110. IP protocol 364 may specify whether the rest of the packet is according to UDP or TCP. TCP header 365 may contain a port number, which is designed to ensure that the packets are delivered to mesh layer in each of the APs. Packet 350 is thus transmitted to AP 140.

Payload 310 is delivered to mesh 240B in view of values in present IP destination address 362, protocol 364, and port number in TCP header 365. Mesh 240B compares the IP address in final destination 303 to recognize that AP 140 is not the final destination of payload 310. TTL 308 is decremented by one, and assuming that TTL is not equal to zero, mesh 240B requests that payload 310 be transmitted to each of the neighbors APs 130, 160 and 150. The description is continued with respect to transmission to AP 160.

The content of packet transmitted from AP 140 to AP 160 is similar to that described above with respect to FIG. 3B, except that MAC header 361, present IP destination address 362 and present IP source address 363 would reflect transmission from AP 140 as source, and AP 160 as destination for this (present) hop. In particular, the present destination address 362 is set to the IP address of (assigned to) AP 160, present source address 363 is set to the IP address of AP 110 and TTL value would have one less than in the packet received from AP 110. The MAC addresses may also similarly reflect the transmitting AP and the receiving AP.

The packet thus formed is transmitted wirelessly to AP 160. In view of the values in present IP destination address 362 and TCP header 365, the packet is forwarded by MAC 260E, IP layer 260D and UDP/TCP layer 260C to mesh 260B.

Mesh 260B compares the IP address in field 303 with self-IP address (i.e., the IP address of AP 160) to determine (in view of equality) that the packet is destined to AP 160. Accordingly, the packet is forwarded to application layer 260A for further processing. The data thus received is consumed by the application as a basis to provide various functions, for which the application is designed.

In an embodiment, one of such functions is to perform management action specified in the data elements of payload if frame type 309 indicates that the packet represents a management command. For example, management statistics may be gathered within the AP and sent as a response to the management command if the data elements so specify.

Although only AP 140 is noted above as receiving payload frame 310 from AP 110, and as forwarding payload frame 310 to AP 160, it may be appreciated that AP 110 may also transmit frame 310 to its other neighbors (AP 120, and AP 130), which in turn may further forward the frame 310 to their respective neighbors. Thus, multiple copies of frame 310 may eventually reach AP 160, which may discard redundant copies based on the examination of the sequence number entry in field 308.

The example of FIG. 2 a specific instance of data transmission from a source AP to a destination AP via an intermediary AP, along the specific shortest path the packet is delivered to the intended destination (shown in field 303). However, according to an aspect of the present invention, each AP may transmit a packet to each of the neighbors (except the neighbor AP from which the packet is received). The general technique according to which an AP may operate is described with respect to the flowcharts of FIGS. 4A and 4B next.

4. Operations in APs

FIG. 4A is a flowchart illustrating the operations in an AP that is the source of data destined for a final destination AP, in an embodiment. The flowchart is described with respect to AP 110 of FIG. 1 merely for illustration. However, the steps apply in general to each AP that is the source (as opposed to mere forwarder/relay) of data sought to be transmitted to a destination AP. Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 401, in which control passes immediately to step 410.

In step 410, AP 110 discovers its neighbor APs and their IP addresses. Such discovery may be performed when AP 110 is powered up and also as neighbors are added/removed. In an embodiment, each AP has a unique IP address, a unique MAC address and is also configured with a mesh identifier shared with all APs sought to be part of a single mesh (as in FIG. 1). Each AP may broadcast (MAC address set to broadcast address) a beacon frame with the assigned (self) IP address and the mesh identifier(s) encoded in a proprietary information element field.

Thus, each AP may accordingly form neighbor information corresponding to all such beacon frames received from other APs. APs with the same Mesh ID become part of the same mesh, and it is assumed for ease of understanding that all APs are part of a single mesh (requiring connectivity with each other). Based on the discovery, AP 110 maintains a table listing the neighbor APs, and their MAC addresses and IP addresses, as shown in FIG. 5A, in which table 500 is shown with rows 501, 502 and 503. Each row lists a neighbor AP with the corresponding IP and MAC addresses. IP2, IP3, and IP4 represent the IP addresses of APs 120, 130 and 140 respectively. MAC2, MAC3 and MAC4 represent the MAC addresses of APs 120, 130 and 140 respectively.

The example tables 510 and 520 of FIGS. 5B and 5C respectively are similar tables maintained in AP 120 and AP 160. IP1 and MAC1 respectively represent the IP address and MAC address of AP 110. IP5 and MAC5 respectively represent the IP address and MAC address of AP 150. Each of the other APs of FIG. 1 may also store similar tables. Although shown as a single table, in practice the contents of the tables may be stored in two separate tables. Thus, the neighbor APs and their IP addresses (shown as 505 in FIG. 5A) may be stored in one 'neighbor' table accessible by mesh layers, while the IP addresses and the corresponding MAC addresses (shown as 506 in FIG. 5A) may be stored in a separate ARP (address resolution protocol) table accessible at MAC layer. The contents of tables in the other APs may also be similarly stored in separate neighbor and ARP tables. Control then passes to step 420.

In step 420, AP 110 receives data to be sent, as well as the final destination address of the final destination AP (here AP 160). The data is received from application layer APP 210A. Control then passes to step 430.

In step 430, AP 110 forms a payload containing the data and the address of the final destination AP. The forming of payload (for example, payload 310 of FIG. 3A) may be performed as described above. Control then passes to step 440.

In step 440, AP 110 forwards the payload to each neighbor in an IP packet (e.g., using WDS). Thus, the entries in neighbor table 505 are examined to determine that the payload is to be transmitted to each of AP120, AP130 and AP140. Three separate IP packets, with the IP addresses of the corresponding APs in the 'present IP destination address' (field 362), are accordingly constructed, and the payload is accordingly transmitted in each of the packets to corresponding three APs. Control then passes to step 420, in which AP 110 may receive another data and the corresponding steps described above may be repeated.

FIG. 4B is a flowchart illustrating the operations in an AP that is either a destination AP for a payload or an intermediary AP for further forwarding the payload, in an embodiment. The flowchart is described with respect to AP 140 of FIG. 1 merely for illustration. However, the steps apply in general to other destination or forwarding APs as well. Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 451, in which control passes immediately to step 455.

In step 455, AP 140 receives a packet. Control then passes to step 456, in which AP 140 determines if the packet is to be discarded (dropped). As noted above, multiple copies of a same payload may be received in AP 140 via several paths (containing corresponding APs), and AP 140 may discard redundant copies of the same payload/packet. Thus, for example, AP 140 may receive a same packet directly from AP 110 and also via AP 130, and sequence number 308 may be used to identify the duplicate reception and the packet may be discarded. Alternatively, the TTL field also can be a basis to discard the packet, as described above briefly. If the packet is not discarded, control then passes to step 460. If the packet is discarded control passes to step In step 460, AP 140 determines if the final destination IP address (similar to as in field 303 of payload 310) in the packet is the same as its own (self) IP address. If the final destination IP address is the same as the self IP address, control passes to step 490 (as would happen in case of AP 160 in the example of FIG. 2), otherwise control passes to step 480 (as would happen in case of AP 140 in the example of FIG. 2).

In step 480, AP 140 (or mesh layer therein) forwards the payload to each of its neighbors (determined based on the table of FIG. 5). The forwarding may be performed in a manner similar to that described with respect to AP 140 in the example of FIG. 2. Control then passes to step 485.

In step 485, AP 140 determines if the final destination IP address is a broadcast IP address. A broadcast address may be indicated by a pre-arranged specific value of the final destination IP address, such as for example, 0xFFFF. If the if the final destination IP address is a broadcast IP address, control passes to step 490, and otherwise to step 455.

In step 490, AP 140 passes the payload portion of the received packet to its application layer (APP 260A), which may extract the data of interest in the payload, and process the data suitably. Control then passes to step 455, and the operation of the corresponding steps of the flowchart may be performed repeatedly for each packet.

Extended/mesh connectivity between APs of a WLAN is thus provided. It may be appreciated that the base source and final destination nodes can merely operate as stations, though they have been described as APs. However, implementation of all stations within a mesh as respective APs as well, may simplify provisioning of mesh connectivity as many nodes are deployed in a wireless network (without requiring substantial planning of location of APs, etc.).

Each of the APs of FIG. 1 may be implemented using hardware, software, firmware or as a desired combination thereof. The description is continued with respect to a digital processing system in which various features are operative when the corresponding executable modules are executed.

5. Digital Processing System

Figure 6:
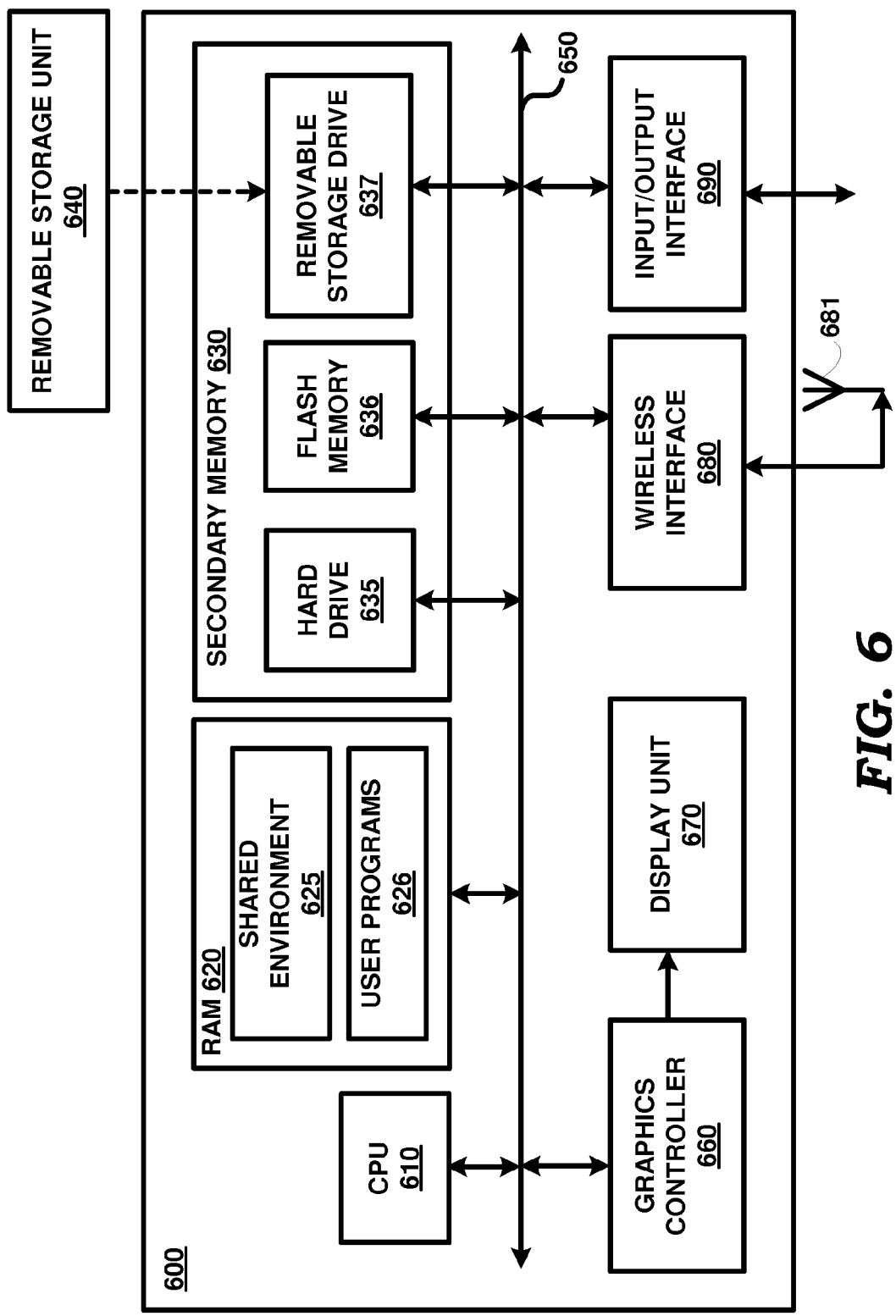
FIG. 6 is a block diagram illustrating the details of a digital processing system in which various aspects of the present invention are operative by execution of appropriate executable modules.

FIG. 6 is a block diagram illustrating the details of digital processing system 600 in which various aspects of the present invention are operative by execution of appropriate executable modules. Digital processing system 600 may correspond to any of the APs of FIG. 1.

Digital processing system 600 may contain one or more processors (such as a central processing unit (CPU) 610), random access memory (RAM) 620, secondary memory 630, graphics controller 660, display unit 670, wireless interface 680, and input/output interface 690. All the components except display unit 670 may communicate with each other over communication path 650, which may contain several buses as is well known in the relevant arts.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting shared environment 625 and/or user programs 626. Shared environment 625 contains utilities shared by user programs, and such shared utilities include operating system, device drivers, etc., which provide a (common) run-time environment for execution of user programs/applications.

Graphics controller 660 generates display signals (e.g., in RGB format) to display unit 670 based on data/instructions received from CPU 610. Display unit 670 contains a display screen to display the images defined by the display signals. Input/output interface 690 includes input as well as output devices to enable a user to interact with system 600.

Wireless interface 680 contains corresponding transmit and receive circuits to enable system 600 to communicate (transmit as well as receive) wirelessly (for example according to IEEE 802.11 specifications) using antenna 681.

Secondary memory 630 (representing a non-transitory storage/medium) may contain hard drive 635, flash memory 636, and removable storage drive 637. Secondary memory 630 may store data (for example the corresponding one of tables of FIGS. 5A, 5B and 5C) and software instructions (for example, for performing the steps of the flowcharts of FIGS. 4A and 4B), which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to secondary memory 630. These computer program products are means for providing software to digital processing system 600. CPU 610 may retrieve the software instructions, and execute the instructions to provide various features of the present invention described above.

6. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of providing extended connectivity based on wireless paths between stations of a wireless local area network (WLAN), said method being performed in a wireless station, said method comprising:
   generating a first set of data elements to be sent and an identity of a final destination to which said first set of data elements are to be delivered, wherein all of said first set of data elements are required to be delivered only to said final destination;

identifying a plurality of neighbor access points (APs) for said wireless station, each of said plurality of neighbor APs being within a wireless communication range of said wireless station;

forming a plurality of Internet Protocol (IP) packets, each with a corresponding header portion and a payload portion, said header portion of each IP packet specifying a corresponding IP address of a respective neighbor AP of said plurality of neighbor APs as the next hop destination on said WLAN, said payload portion of all of said plurality of IP packets including all of said first set of data elements and an IP address of said final destination to indicate that all of said first set of data elements are to be delivered to said final destination; and transmitting said plurality of IP packets on said WLAN such that each IP packet containing all of said first set of data elements and said IP address of said final destination in said payload portion is delivered to the corresponding neighbor AP of said plurality of neighbor APs according to said corresponding IP address of the respective neighbor AP in the header portion of the IP packet.

2. The method of claim 1, wherein said wireless station is also implemented as a first access point (AP).

3. The method of claim 2, further comprising:

receiving a second payload containing a second plurality of data elements from another neighbor AP, said second payload specifying a second AP as a final destination; and forwarding said second payload to each of said plurality of neighbor APs except said another neighbor AP from which said second payload is received.

4. The method of claim 3, further comprising:

receiving a third payload containing a third plurality of data elements from a third neighbor AP, said third payload specifying said wireless stations itself as a final destination; and forwarding said third plurality of data elements to an application implemented in said wireless station.

5. The method of claim 3, further comprising:

receiving a fourth payload from a fourth neighbor AP, said fourth payload specifying said wireless stations itself as a final destination, said fourth payload containing a field to specify that a management action is required to be performed;

performing said management action in said wireless station; and providing a result of said performing as a response to a base source indicated in said fourth payload.

6. A non-transitory machine readable medium carrying one or more sequences of instructions for execution by one or more processors in a wireless station of a wireless local area network (WLAN), wherein execution of said one or more sequences of instructions by said one or more processors causes said wireless station to perform the actions of:

generating a first set of data elements to be sent and an identity of a final destination to which said first set of data elements are to be delivered, wherein all of said first set of data elements are required to be delivered only to said final destination;

identifying a plurality of neighbor access points (APs) for said wireless station, each of said plurality of neighbor APs being within a wireless communication range of said wireless station;

forming a plurality of Internet Protocol (IP) packets, each with a corresponding header portion and a payload portion, said header portion of each IP packet specifying a corresponding IP address of a respective neighbor AP of said plurality of neighbor APs as the next hop destination on said WLAN, said payload portion of all of said plurality of IP packets including all of said first set of data elements and an IP address of said final destination to indicate that all of said first set of data elements are to be delivered to said final destination; and transmitting said plurality of IP packets on said WLAN such that each IP packet containing all of said first set of data elements and said IP address of said final destination in said payload portion is delivered to the corresponding neighbor AP of said plurality of neighbor APs according to said corresponding IP address of the respective neighbor AP in the header portion of the IP packet.

7. The non-transitory machine readable medium of claim 6, wherein said wireless station is also implemented as a first access point (AP).

8. The non-transitory machine readable medium of claim 7, further comprising instructions to cause said wireless station to perform the actions of:

receiving a second payload containing a second plurality of data elements from another neighbor AP, said second payload specifying a second AP as a final destination; and forwarding said second payload to each of said plurality of neighbor APs except said another neighbor AP from which said second payload is received.

9. The non-transitory machine readable medium of claim 8, further comprising instructions to cause said wireless station to perform the actions of:

receiving a third payload containing a third plurality of data elements from a third neighbor AP, said third payload specifying said wireless stations itself as a final destination; and forwarding said third plurality of data elements to an application implemented in said wireless station.

10. The non-transitory machine readable medium of claim 8, further comprising instructions to cause said wireless station to perform the actions of:

receiving a fourth payload from a fourth neighbor AP, said fourth payload specifying said wireless stations itself as a final destination, said fourth payload containing a field to specify that a management action is required to be performed;

performing said management action in said wireless station; and providing a result of said performing as a response to a base source indicated in said fourth payload.

11. A computing system comprising:

a first wireless station and a plurality of access points (AP) operating according to Wireless Local Area Network (WLAN) technology, wherein said first wireless station is designed to:

generate a first set of data elements for sending to a final destination, wherein all of said first set of data elements are required to be delivered only to said final destination;

identify a plurality of neighbor access points (APs) for said wireless station, each of said plurality of neighbor APs being within a wireless communication range of said wireless station;

form a plurality of Internet Protocol (IP) packets, each with a corresponding header portion and a payload portion, said header portion of each IP packet specifying a corresponding IP address of a respective neighbor AP of said plurality of neighbor APs as the next hop destination on said WLAN, said payload portion of all of said plurality of IP packets all of including said first set of data elements and a second IP address of said final destination to indicate that all of said first set of data elements are to be delivered to said final destination; and transmit said plurality of IP packets on said WLAN such that each IP packet containing all of said first set of data elements and said second IP address of said final destination in said payload portion is delivered to the corresponding neighbor AP of said plurality of neighbor APs according to said corresponding IP address of the respective neighbor AP in the header portion of the IP packet.

12. The computing system of claim 11, wherein said second IP address is the address of said final destination, wherein said first neighbor AP is designed to:

receive said first IP packet;

determine whether said second IP address is the same as said IP address of said first neighbor AP; and to forward said payload to an application executing in said first neighbor AP if said second IP address is the same as said IP address of said first neighbor AP, but to forward said payload in a second IP packet to a second neighbor AP in said plurality of APs, said first neighbor AP and said second neighbor AP being neighbors.

13. The computing system of claim 12, wherein said first neighbor AP is further designed to:

determine whether said second IP address is a broadcast IP address; and forward said payload to said application if said second IP address is the same as said broadcast IP address.

14. The computing system of claim 13, wherein said first wireless station is designed to:

form a plurality of IP packets, each with said payload portion and with the corresponding header portion specifying an IP address of respective ones of said plurality of neighbor APs; and transmit each of said plurality of IP packets.

15. The computing system of claim 14, wherein said first neighbor AP is further designed to:

receive a third IP packet comprised in said plurality of IP packets;

examine a field in a payload portion of said third IP packet; and to discard said third IP packet if said field indicates that said third IP packet is a duplicate of said first IP packet.

16. The computing system of claim 15, wherein said first neighbor AP is designed to:

receive a fourth payload from a fourth neighbor AP, said fourth payload specifying said wireless station first neighbor AP itself as a final destination, said fourth payload containing a field to specify that a management action is required to be performed;

perform said management action; and provide a result of said performing as a response to a base source indicated in said fourth payload.

17. The computing system of claim 16, wherein said first wireless station is an AP.

* * * * *